(12) United States Patent
Winkler

(10) Patent No.: US 8,111,922 B2
(45) Date of Patent: Feb. 7, 2012

(54) BI-DIRECTIONAL HANDWRITING INSERTION AND CORRECTION

(75) Inventor: David V. Winkler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 11/811,367

(22) Filed: Jun. 8, 2007

(65) Prior Publication Data

US 2008/0304719 A1 Dec. 11, 2008

(51) Int. Cl.
*G06K 9/00* (2006.01)
(52) U.S. Cl. .................................. 382/187; 382/181
(58) Field of Classification Search .............. 382/119, 382/187
See application file for complete search history.

(56) References Cited

U.S. PATENT DOCUMENTS

| | | | |
|---|---|---|---|
| 5,454,046 A * | 9/1995 | Carman, II | 382/186 |
| 5,586,198 A | 12/1996 | Lakritz | |
| 6,018,591 A * | 1/2000 | Hull et al. | 382/186 |
| 6,148,104 A | 11/2000 | Wang et al. | |
| 6,460,015 B1 * | 10/2002 | Hetherington et al. | 704/8 |
| 6,633,671 B2 * | 10/2003 | Munich et al. | 382/187 |
| 6,718,060 B1 | 4/2004 | Yokota et al. | |
| 2003/0007018 A1 | 1/2003 | Seni et al. | |
| 2003/0046087 A1 | 3/2003 | Johnston et al. | |
| 2003/0110021 A1 * | 6/2003 | Atkin | 704/1 |
| 2003/0224845 A1 | 12/2003 | Kogod et al. | |
| 2006/0193518 A1 | 8/2006 | Dong | |

FOREIGN PATENT DOCUMENTS

| | | |
|---|---|---|
| EP | 1705554 A2 | 9/2006 |
| WO | 0115437 A1 | 3/2001 |

OTHER PUBLICATIONS

Marukatat, et al., "A Flexible Recognition Engine for Complex On-line Handwritten Character Recognition", http://ieeexplore.ieee.org/iel5/8701/27545/01227817.pdf?isNumber=, 2003.
Rose, et al., "Text Recognition using Collocations and Domain Codes", http://ucrel.lancs.ac.uk/acl/W/W93/W93-0308.pdf, 1993.
Yaeger, et al., "Combining Neural Networks and Context-Driven Search for On-Line, Printed Handwriting Recognition in the Newton", http://www.beanblossom.in.us/larryy/Yaegeretal.AIMag.pdf, 1998.
Mark Davis, et al., "The Bidirectional Algorithm", Dec. 22, 2002, pp. 1-29, http://www.unicode.org/reports/tr9/.

* cited by examiner

*Primary Examiner* — Stephen Koziol

(57) ABSTRACT

Various technologies and techniques are disclosed for providing bi-handwriting directional handwriting recognition and correction. A combined handwriting recognizer is provided that supports left-to-right and right-to-left language recognition by using a combined dictionary. The combined dictionary includes a dictionary from a language in a first direction, along with a backwards version of a dictionary from a language in a second direction. The combined recognizer is used with the combined dictionary to generate a most likely recognition result for mixed direction hand written input received from a user. Character by character correction is provided for mixed left-to-right and right-to-left text. The most likely recognition result is displayed in a visual order. The user can correct a particular character to a different character. When recognized text needs to be sent to a separate application, an inverse bi-directional process is performed to convert the text from the visual order to the logical order.

19 Claims, 14 Drawing Sheets

253 — 452
paragraph embedding : 0
ex : 000000000000000000000000
im : 000000000111011111000000 ov : he said "RAC SNAEM car."
cv : he said "SNAEM RAC car."  454
458   ol : he said "?car means CAR?."
cl : he said "CAR MEANS car."  456
460   ...[portions omitted]...

151.1 — 462
paragraph embedding : 0
ex : 000000001111111111111111
im : 000000001111111111122211
{8,RLE} — 463
ov : he said "RAC SNAEM car."
cv : he said "RAC SNAEM car."  464
468   ol : he said "?car means CAR?."
cl : he said ?".car MEANS CAR"  466
470   471 ...[portions omitted]...

7 — 472
paragraph embedding : 0
ex : 000000000111111111111100
im : 000000000111111111122200
473 — {9,RLE},{22,PDF} — 474
ov : he said "RAC SNAEM car."
cv : he said "RAC SNAEM car."  475
478   ol : he said "?car means CAR?."
480 — cl : he said "?car MEANS CAR?."  476
482                                    484

BI-DIRECTIONAL HANDWRITING INSERTION AND CORRECTION

BACKGROUND

There are thousands of languages for communication that exist today that have handwritten words, as well as spoken words. Some of these languages, such as English, are written in a left-to-right format. This means that the writer will hand write the desired words in a direction that is from left-to-right. Other languages, such as Hebrew and Arabic, are written in a right-to-left format. This means that the writer will write the desired words in a direction that is from right-to-left. The words in a right-to-left language are thus formed and written in an opposite direction than the words in a left-to-write language, and vice versa. Some languages, such as modern Hebrew, mix right-to-left words with left-to-right numbers.

In the world of pen-based computing, there are numerous computers that can be purchased with pen input capabilities, such as tablet PC's, personal digital assistants, and other similar devices. Handwriting recognizers are included on these pen-based computers to allow a user to input text in a handwritten format for recognition by the computer. A problem with current handwriting recognizers is that they have in general been designed to work in one particular direction, such as left-to-right or right-to-left. This means that a user who is multi-lingual or otherwise wishes to write a combination of mixed text in a left-to-right format along with a right-to-left format is unable to do so.

SUMMARY

Various technologies and techniques are disclosed for providing bi-directional handwriting recognition and correction. A combined handwriting recognizer is provided that supports left-to-right and right-to-left language recognition by using a combined dictionary. The combined dictionary includes a dictionary from a language in a first direction, along with a backwards version of a dictionary from a language in a second direction. The combined recognizer is used with the combined dictionary to generate a most likely recognition result for mixed hand written input received from a user. Character by character correction is provided for mixed left-to-right and right-to-left text. The most likely recognition result is displayed in a visual order. The user can correct a particular character to a different character in the combined dictionary. When recognized and/or corrected text needs to be sent to a separate application, an inverse bi-directional process is performed to convert the text from the visual order to the logical order.

In one implementation, the inverse bi-directional process receives an original visual string for handwriting that has been recognized by a combined recognizer. A beam search is then performed that uses a heuristic cost function to estimate a promise of each node being examined. When the beam search finishes, a best guess is produced for a logical order of the visual string.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 10 is a diagram for one implementation of the system of FIG. 1 that illustrates some exemplary analysis results produced at some selected iterations of the exemplary cost function of FIG. 9 called iteratively during the bi-directional process.

DETAILED DESCRIPTION

Figure 1:
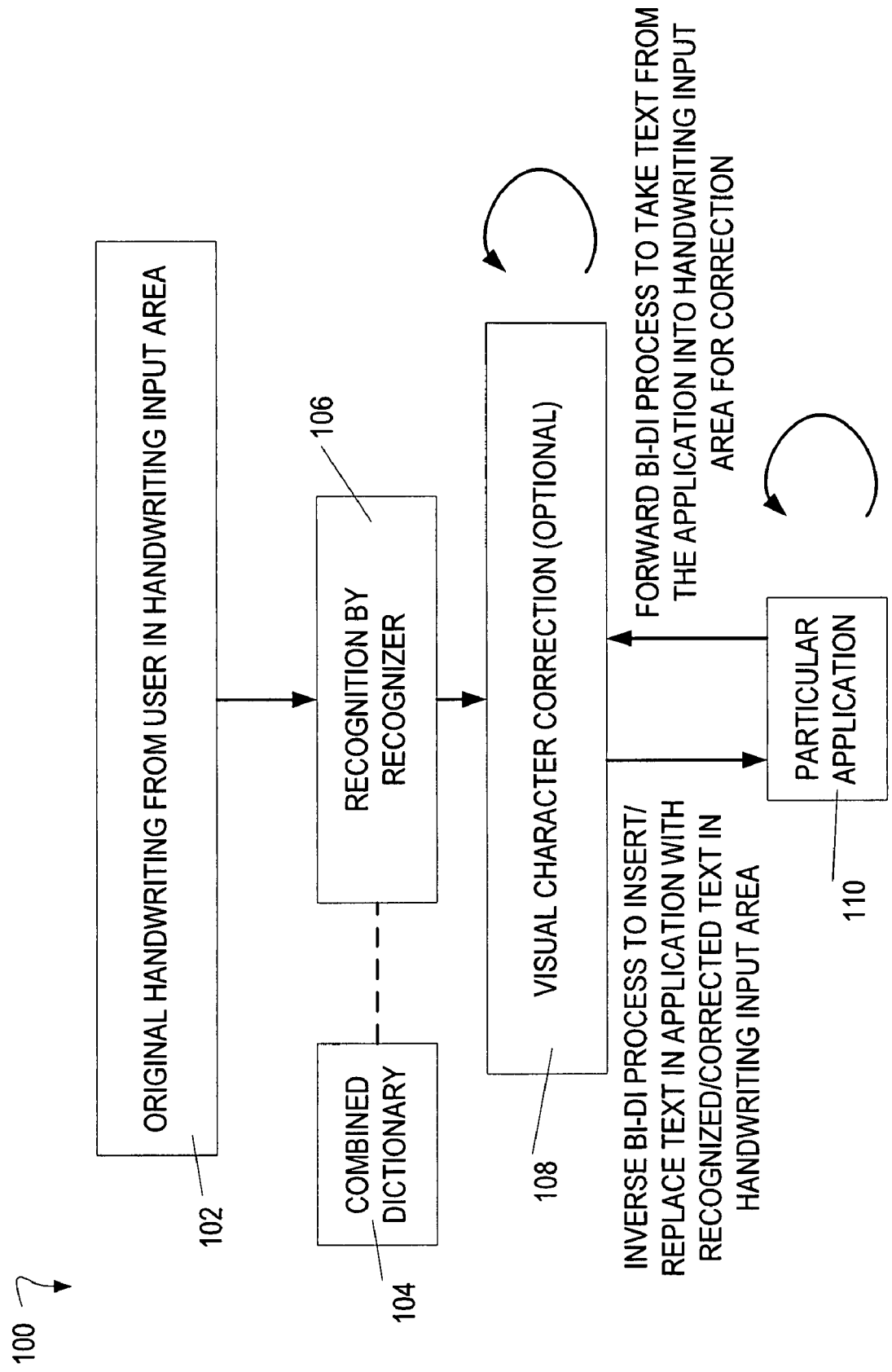
FIG. 1 is a diagrammatic view of a bi-directional handwriting system and some logical components used by the system in one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that supports bi-directional handwriting recognition, but the system also serves other purposes in addition to these. In one implementation, one or more of the techniques described herein can be implemented as features within a handwriting recognizer program, or from any other type of program or service that processes handwriting input and/or converts handwritten input to formats used by other applications.

In one implementation, a system is provided that allows a user to enter text in a mixed format from left-to-right and right-to-left languages in a handwriting input area. The recognizer is able to recognize the characters in both directional languages, and display the results to the user. The user can then perform character by character correction of the recognized results as desired. The user can send the results to another application, such as a word processing program, spreadsheet, etc. When an option to send the recognized text to another application is selected, an inverse bi-directional process is executed in order to convert the visual order of the recognized text into the logical order that is expected by the other application. The Unicode character ordering is an example of a logical ordering, and is the logical ordering that is used in the figures herein. The Unicode display order is an example of a visual ordering, and is the visual ordering that is used in the figures herein.

FIG. 1 illustrates a bi-directional handwriting system 100 and some logical components used by the system in one implementation. Original handwriting is received from the user in a handwriting input area 102. This handwritten input 102 is provided to a recognizer for recognition 106. The recognizer uses a combined dictionary 104, as described in further detail in FIG. 4. The recognized results are displayed to a user, and visual character by character correction 108 can be optionally performed by the user as desired. In one implementation, this character by character correction is performed within the handwriting input area. In another implementation, the character by character correction is performed within some other program.

If a user desires to send the recognized text to another application, an inverse bi-directional process is performed to replace and/or insert the text in the application with the recognized and optionally corrected text present in the handwriting input area. This inverse bi-directional process converts the visual order of the recognized text into the logical order expected by most other applications, as described in further detail in several figures herein, such as FIGS. 7-10. If the user desires to take text from the other application into the handwriting input area for correction, then a forward bi-directional process is performed to convert the text from the logical order to a visual order that is displayed in the handwriting input area.

Figure 2:
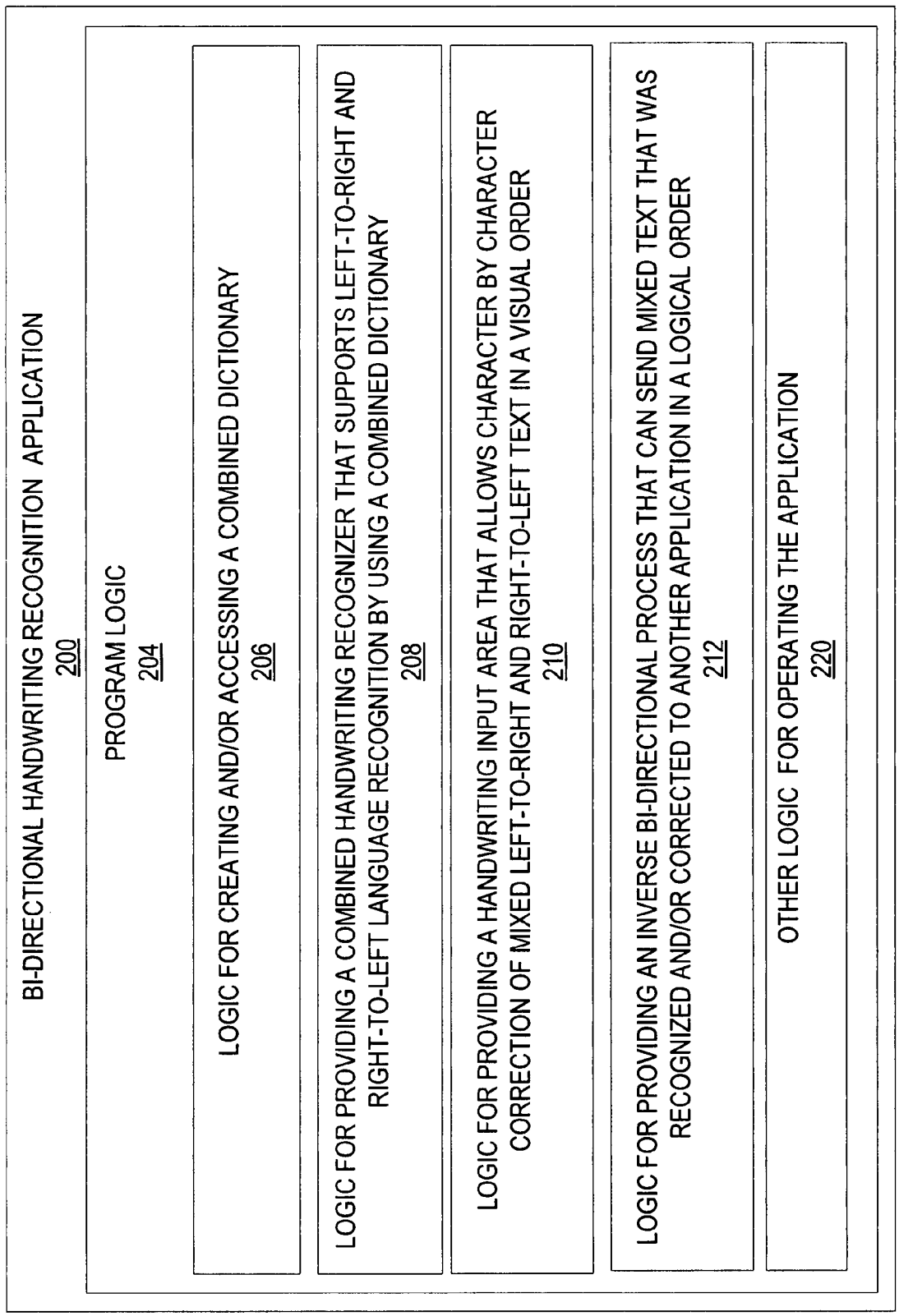
FIG. 2 is a diagrammatic view of a bi-directional handwriting recognition application of one implementation operating on the computer system of FIG. 1.

Turning now to FIG. 2, a bi-directional handwriting recognition application 200 operating on computing device 540 (of FIG. 14) is illustrated. Bi-directional handwriting recognition application 200 is one of the application programs that reside on computing device 540 (of FIG. 14). However, it will be understood that bi-directional handwriting recognition application 200 can alternatively or additionally be embodied as computer-executable instructions on one or more computers and/or in different variations than shown on FIG. 14. Alternatively or additionally, one or more parts of bi-directional handwriting recognition application 200 can be part of system memory 544 (of FIG. 14), on other computers and/or applications 558 (of FIG. 14), or other such variations as would occur to one in the computer software art.

Bi-directional handwriting recognition application 200 includes program logic 204, which is responsible for carrying out some or all of the techniques described herein. Program logic 204 includes logic for creating and/or accessing a combined dictionary 206; logic for providing a combined handwriting recognizer that supports left-to-right and right-to-left language recognition by using a combined dictionary 208; logic for providing a handwriting input area that allows character by character correction of mixed left-to-right and right-to-left text in a visual order 210; logic for providing an inverse bi-directional process that can send mixed text that was recognized and/or corrected to another application in a logical order 212; and other logic for operating the application 220. In one implementation, program logic 204 is operable to be called programmatically from another program, such as using a single call to a procedure in program logic 204.

Figure 3:
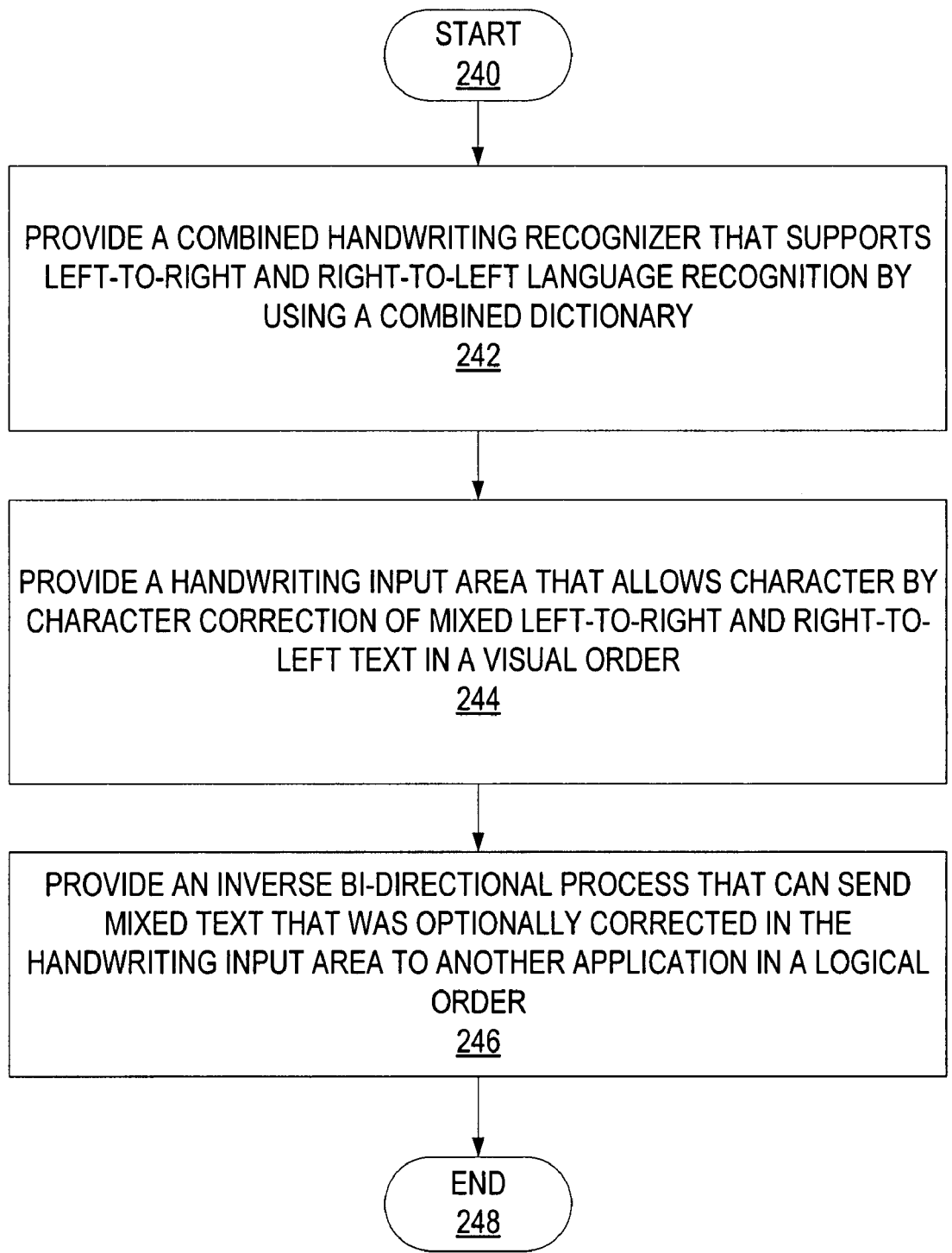
FIG. 3 is a high-level process flow diagram for one implementation of the system of FIG. 1.

Turning now to FIGS. 3-9 with continued reference to FIGS. 1-2, the stages for implementing one or more implementations of bi-directional handwriting recognition application 200 are described in further detail. FIG. 3 is a high level process flow diagram for bi-directional handwriting recognition application 200. In one form, the process of FIG. 3 is at least partially implemented in the operating logic of computing device 540 (of FIG. 14). The process begins at start point 240 with the system providing a combined handwriting recognizer that supports left-to-right and right-to-left language recognition by using a combined dictionary (stage 242). A handwriting input area is provided that allows character by character correction of mixed left-to-right and right-to-left text in a visual order (stage 244). An inverse bi-directional process is used to send mixed text that was optionally corrected in the handwriting input area to another application in a logical order as desired (stage 246). The process ends at end point 248.

Figure 4:
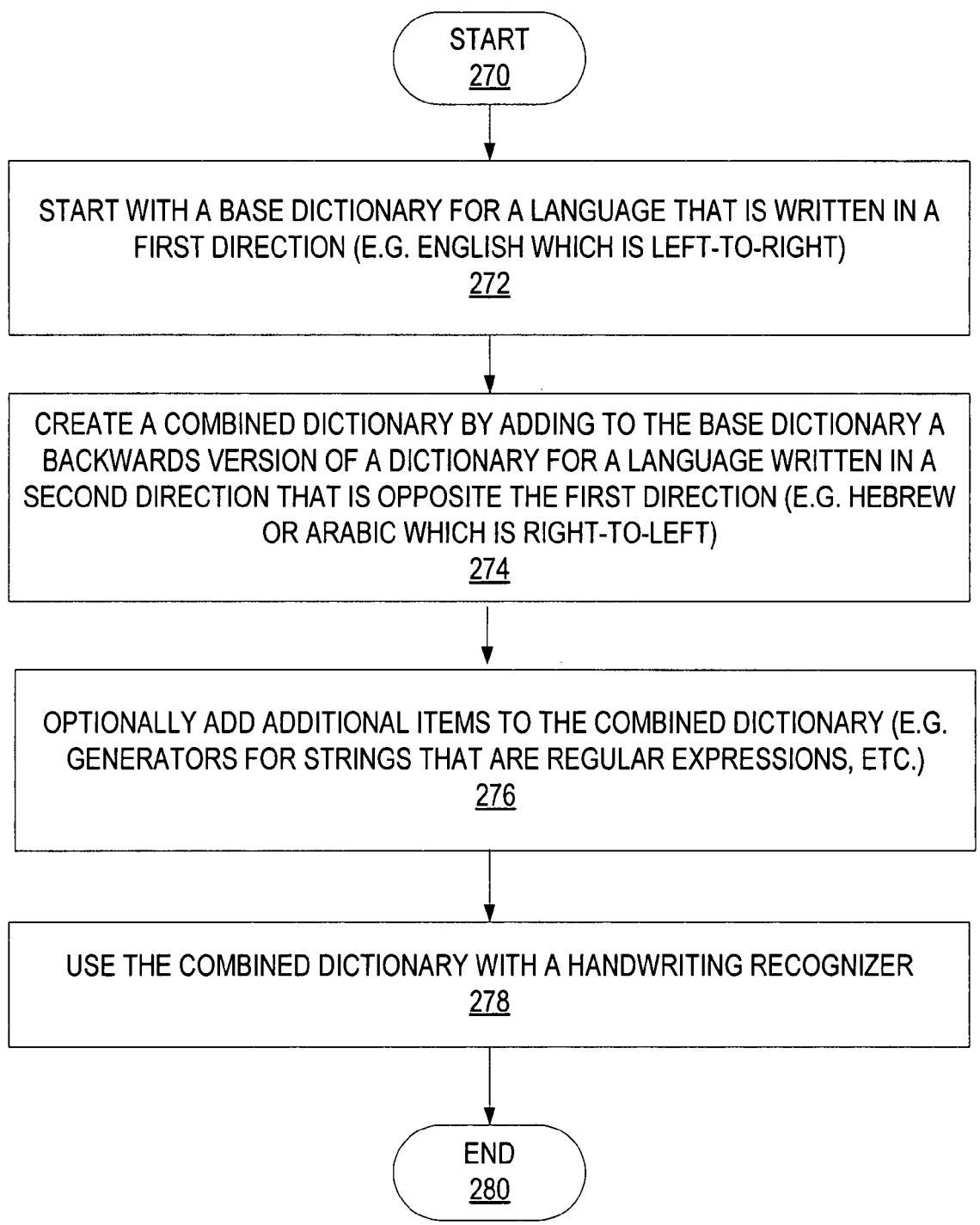
FIG. 4 is a process flow diagram for one implementation of the system of FIG. 1 illustrating the stages involved in creating a combined dictionary for use with combined handwriting recognizer.

FIG. 4 illustrates one implementation of the stages involved in creating a combined dictionary for use with combined recognizer. In one form, the process of FIG. 4 is at least partially implemented in the operating logic of computing device 540 (of FIG. 14). The process begins at start point 270 with starting with a base dictionary for language that is written in a first direction (e.g. English which is left-to-right) (stage 272). The system creates a combined dictionary by adding to the base dictionary a backwards version of a dictionary for a language written in a second direction that is opposite the first direction (e.g. Hebrew or Arabic which is right-to-left) (stage 274). Thus, the term "combined dictionary" as used herein is meant to include a dictionary that includes a dictionary from one language in one direction, along with a backwards version of a dictionary from a language in another direction. In some implementations, this may include the same language that has words that go in each direction, such as numbers from left-to-right and words from right-to-left. Additional items are optionally added to the combined dictionary (stage 276). For example, some string generators that include a regular expression that describes the text of a number could be added. Another example could include a regular expression that describes a long date ("Monday Jun. 22, 2001"). Yet another example could include a context-free grammar. These are just a few non-limiting examples of additional items, and numerous other items could be used instead of or in addition to these as desired. Some of these additional items can optionally be added backwards to the combined dictionary. The system then uses the combined dictionary with a handwriting recognizer (stage 278). The process ends at end point 280.

Figure 5:
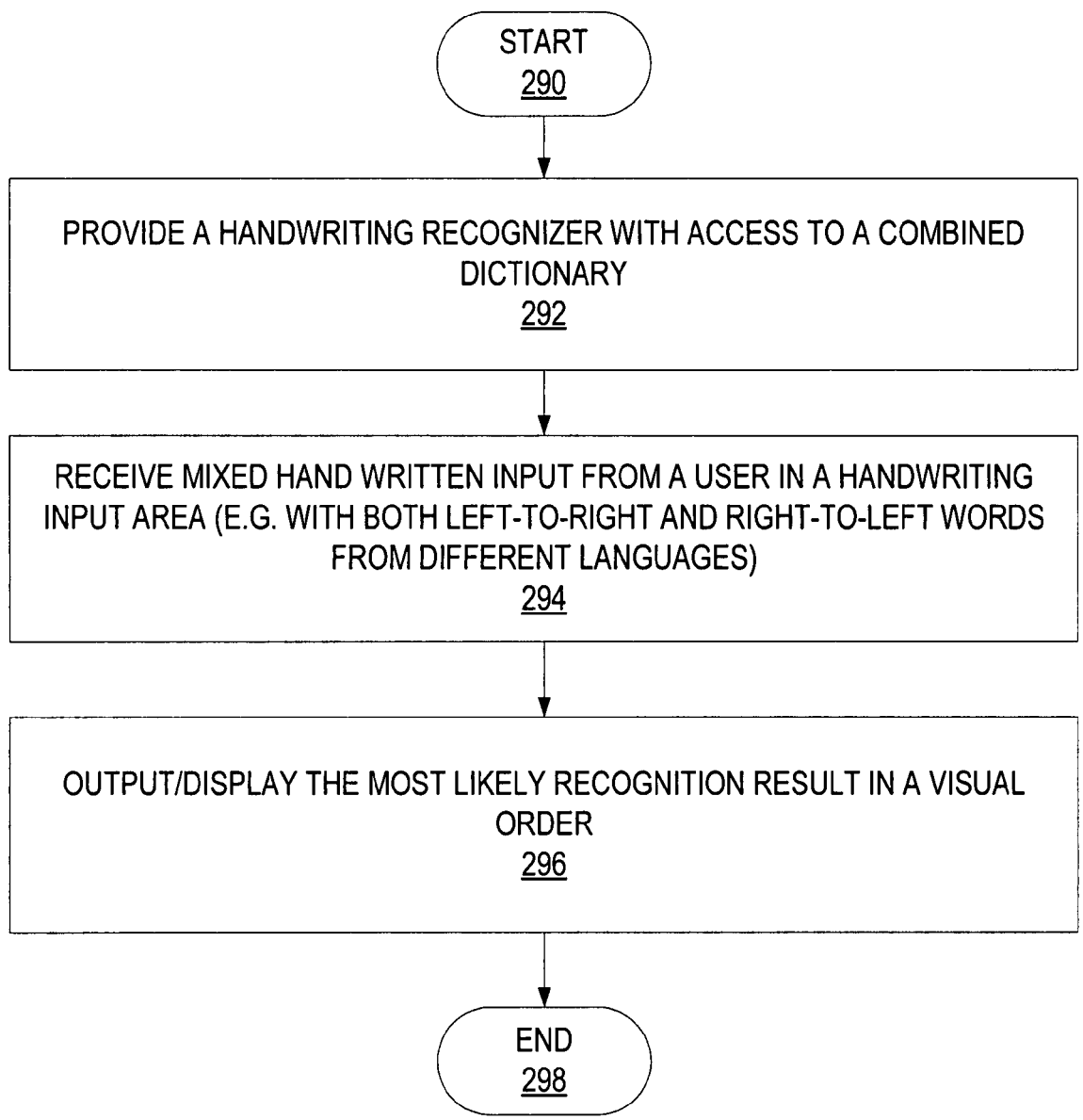
FIG. 5 is a process flow diagram for one implementation of the system of FIG. 1 illustrating the stages involved in providing a combined handwriting recognizer for left-to-right and right-to-left languages.

FIG. 5 illustrates one implementation of the stages involved in providing a combined handwriting recognizer for left-to-right and right-to-left languages. In one form, the process of FIG. 5 is at least partially implemented in the operating logic of computing device 540 (of FIG. 14). The process begins at start point 290 with providing a handwriting recognizer with access to a combined dictionary (stage 292). The system receives mixed hand written input from a user in a handwriting input area (e.g. with both left-to-right and rightto-left words from different languages) (stage 294). The system outputs/displays the most likely recognition result in a visual order (stage 296). The process ends at end point 298.

Figure 6:
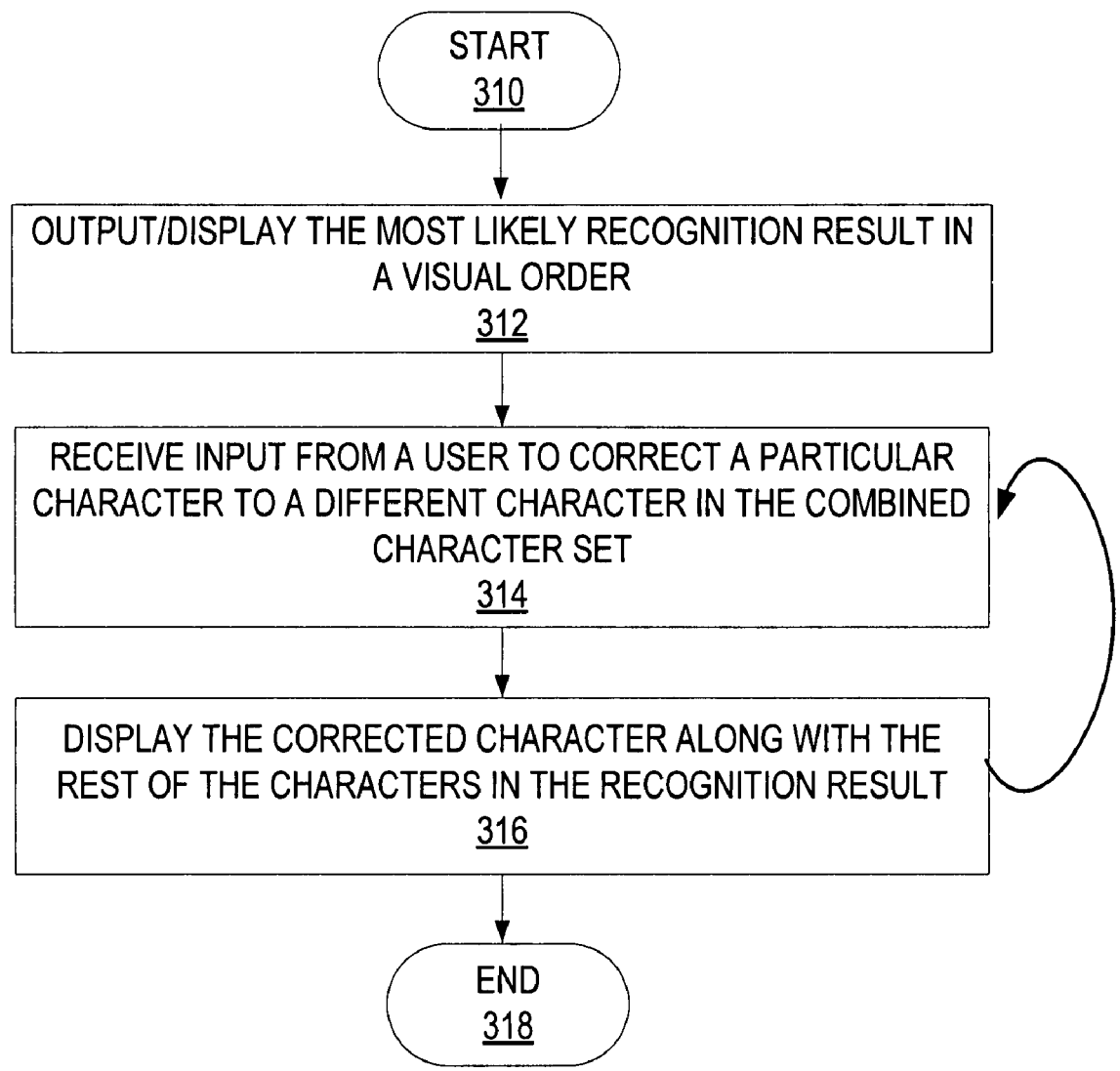
FIG. 6 is a process flow diagram for one implementation of the system of FIG. 1 illustrating the stages involved in providing character by character correction of mixed left-to-right and right-to-left characters.

FIG. 6 illustrates one implementation of the stages involved in providing character by character correction of mixed left-to-right and right-to-left characters. In one form, the process of FIG. 6 is at least partially implemented in the operating logic of computing device 540 (of FIG. 14). The process begins at start point 310 with the system outputting/displaying the most likely recognition results in a visual order (stage 312). The system receives input from a user to correct a particular character to a different character in the combined character set (stage 314). The system displays the corrected character along with the rest of the characters in the recognition result (stage 316). The stages can be repeated for additional character corrections as desired. The process ends at end point 318.

Figure 7:
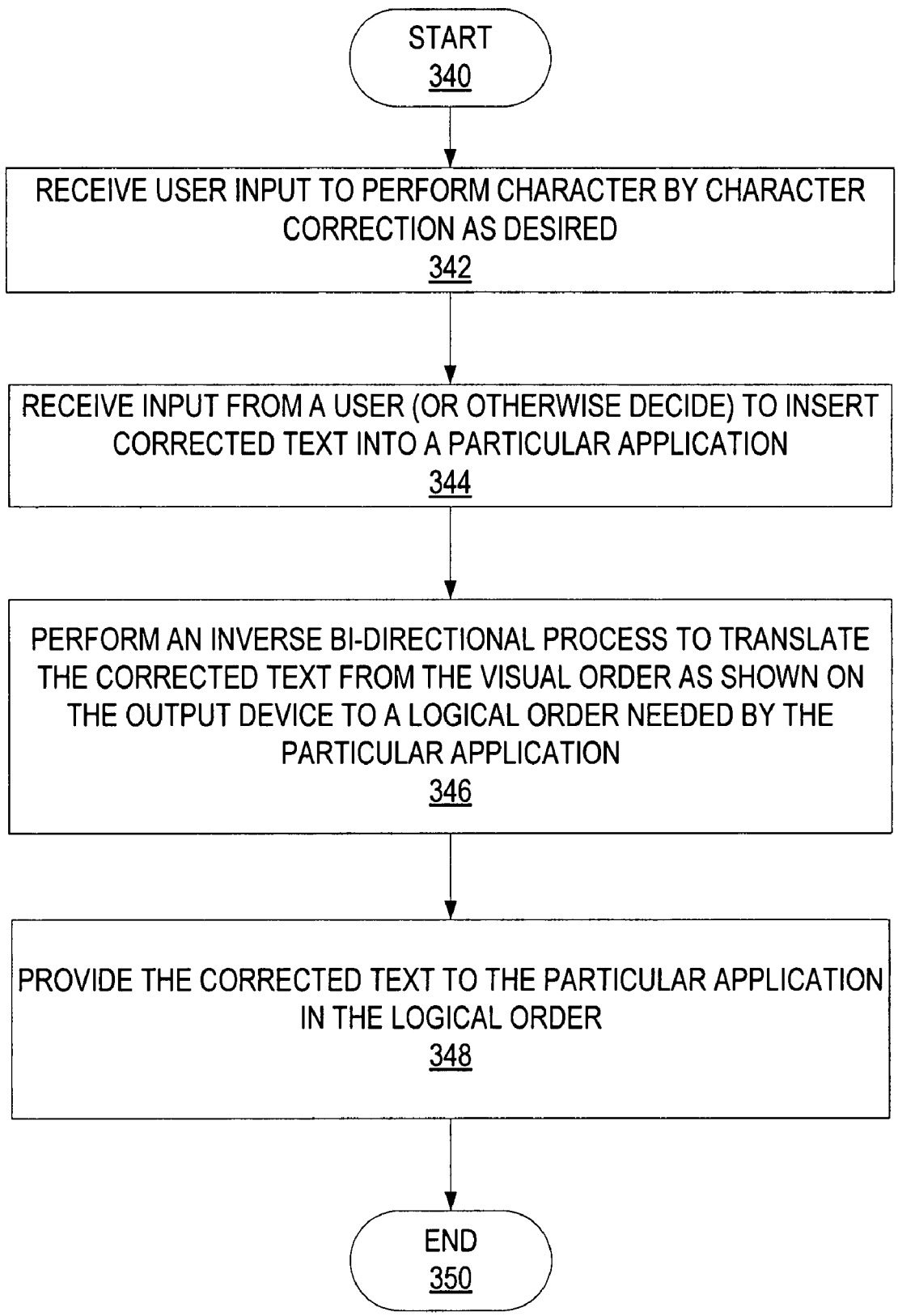
FIG. 7 is a process flow diagram for one implementation of the system of FIG. 1 that illustrates the stages involved in inserting corrected text into an application.

FIG. 7 illustrates one implementation of the stages involved in inserting corrected text into an application. In one form, the process of FIG. 7 is at least partially implemented in the operating logic of computing device 540 (of FIG. 14). The process begins at start point 340 with receiving user input to perform character by character correction as desired (stage 342). The system receives input from a user (or otherwise decides) to insert corrected text into a particular application (stage 344). The system performs an inverse bi-directional process to translate the corrected text from the visual order as shown on the output device to a logical order needed by the particular application (stage 346). The system provides the corrected text to the particular application in the logical order (stage 348). The process ends at end point 350.

Figure 8:
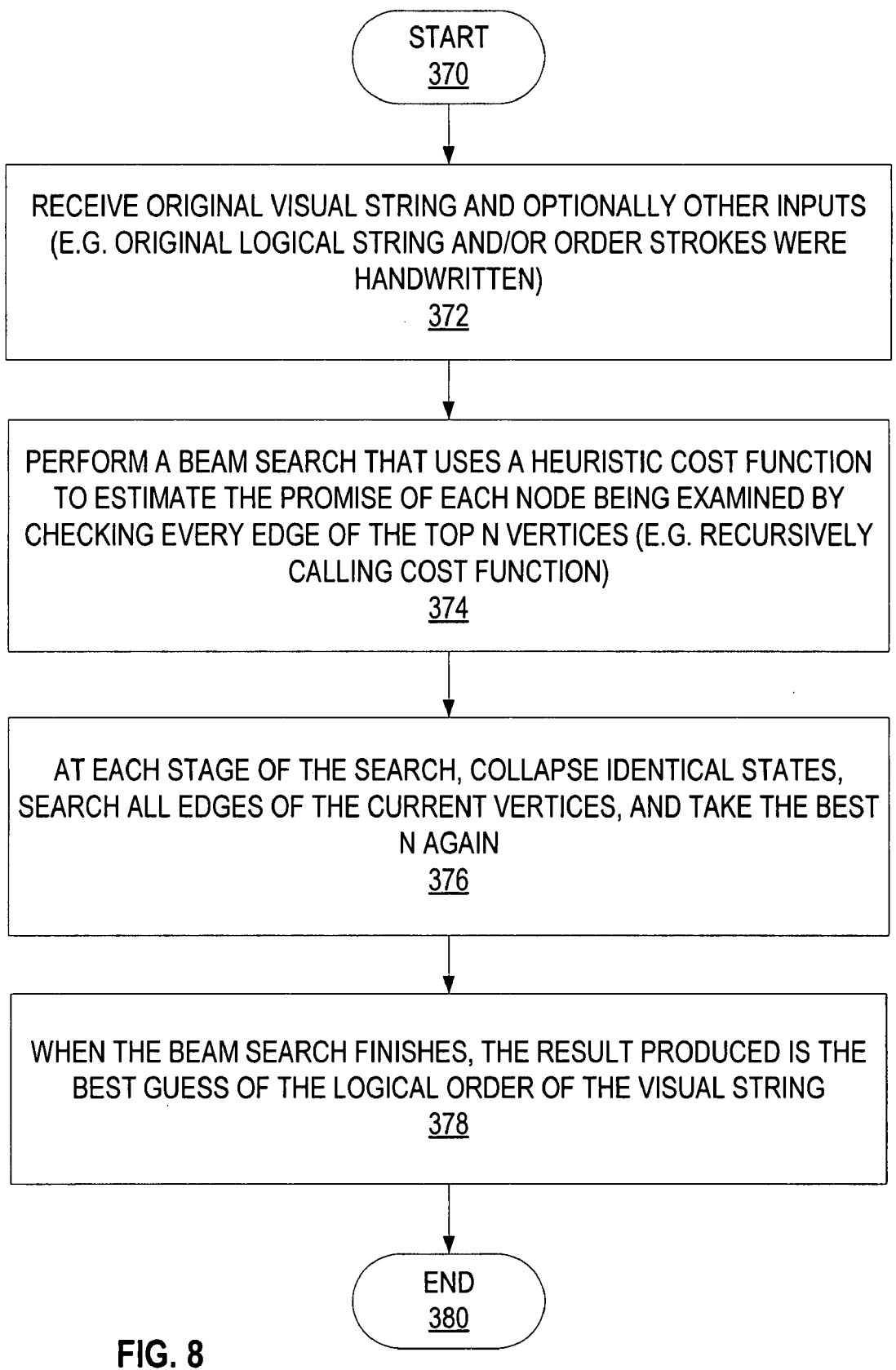
FIG. 8 is a process flow diagram for one implementation of the system of FIG. 1 that illustrates the stages involved in providing an inverse bi-directional process for translating recognized text from visual to logical order.

FIG. 8 illustrates one implementation of the stages involved in providing an inverse bi-directional process for translating recognized text from visual to logical order. In one form, the process of FIG. 8 is at least partially implemented in the operating logic of computing device 540 (of FIG. 14). The process begins at start point 370 with receiving the original visual string and optionally other inputs, such as the original logical string and/or the order strokes were handwritten (stage 372). The system performs a beam search that uses a heuristic cost function to estimate the promise of each node being examined by checking every edge of the top N vertices (e.g. recursively calling the cost function) (stage 374). At each stage of the search, the system collapses identical states, searches all edges of the current vertices, and takes the best N again (stage 376). When the beam search finishes, the result produced is the logical order of the visual string (stage 378). It should be noted that while a beam search is used in one implementation that is described herein, the bi-directional process could operate with other types of searches that produce the desired result of converting a visual order of recognized text to a logical order. The process ends at end point 380.

Figure 9:
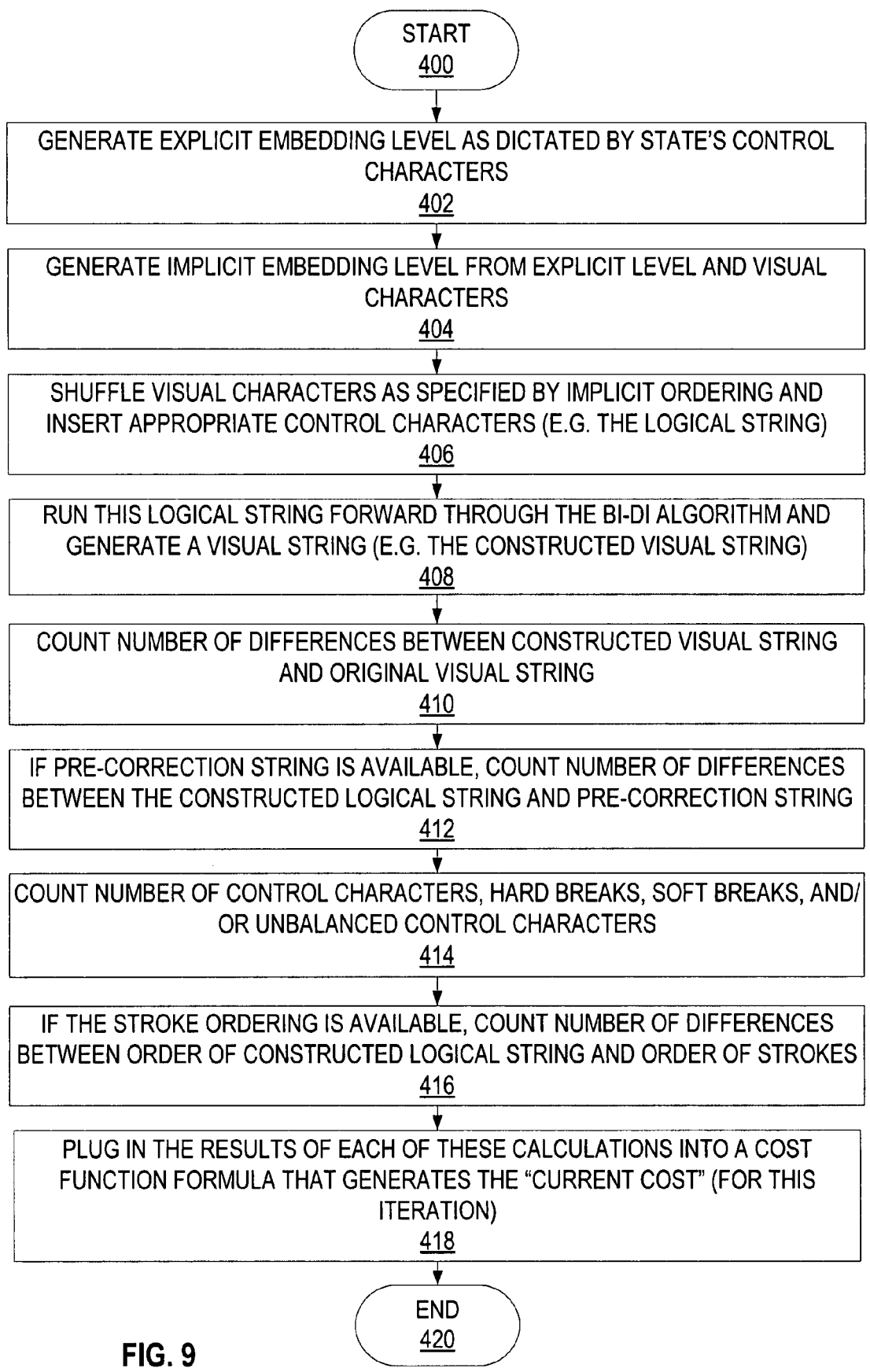
FIG. 9 is a process flow diagram for one implementation of the system of FIG. 1 that illustrates the stages involved in providing an exemplary cost function for use with an inverse bi-directional process.

FIG. 9 illustrates one implementation of the stages involved in providing an exemplary cost function for use with an inverse bi-directional process. It should be noted that various types of cost functions could be used that include some, all, and/or additional computations as described in FIG. 9. The computations discussed in FIG. 9 are just exemplary in nature and are not intended to be limiting in any way.

Figure 14:
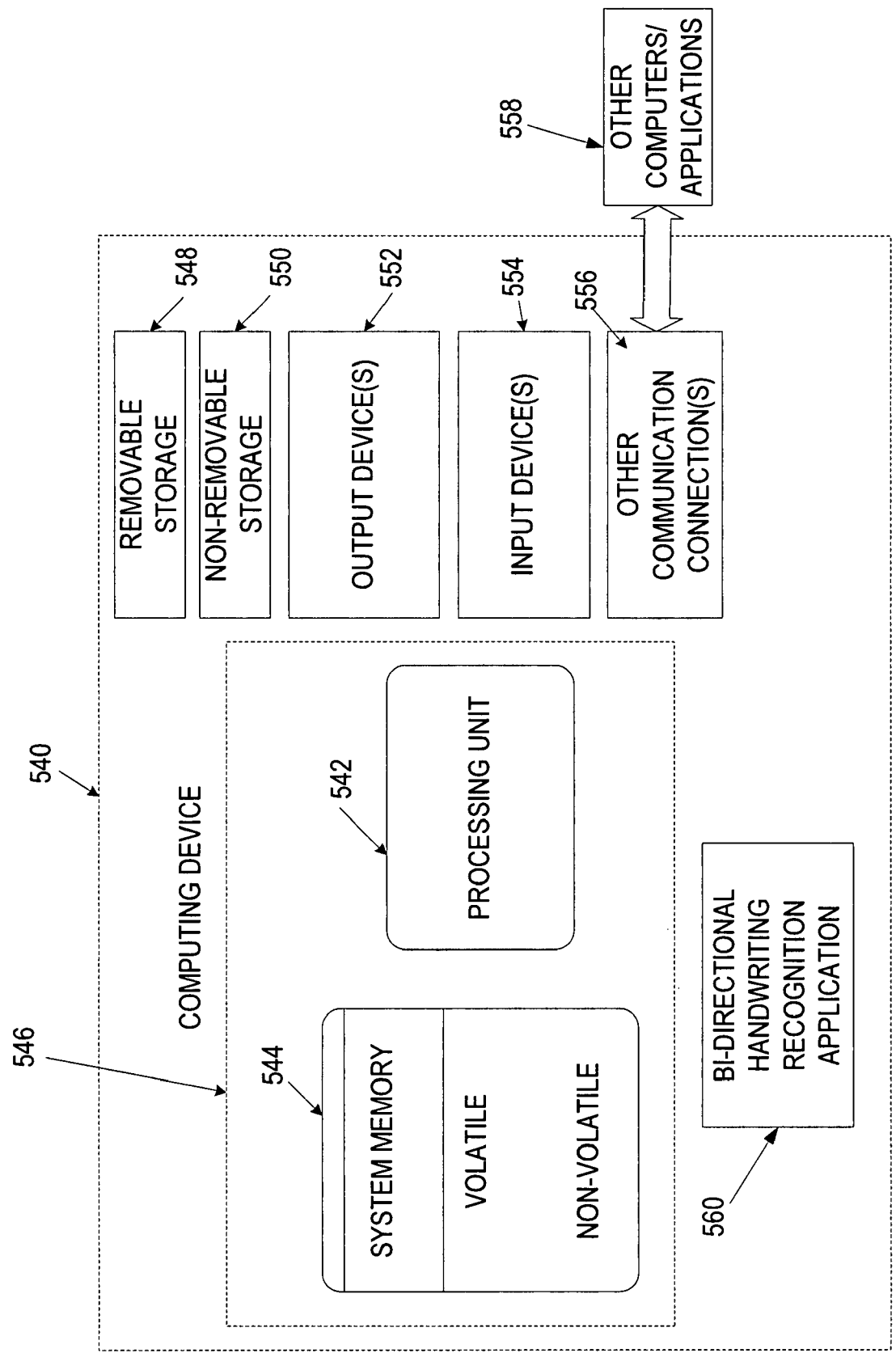
FIG. 14 is a diagrammatic view of a computer system of one implementation.

In one form, the process of FIG. 9 is at least partially implemented in the operating logic of computing device 540 (of FIG. 14). The process begins at start point 400 with generating explicit embedding levels as dictated by the state's control characters (stage 402). Implicit embedding levels are generated from explicit levels and visual characters (stage 404). The system shuffles visual characters as specified by implicit ordering and inserts the appropriate control characters (e.g. the logical string) (stage 406). The system runs this logical string forward through a bi-directional algorithm and generates a visual string (e.g. the constructed visual string) (stage 408). The system counts the number of differences between the constructed visual string and the original visual string (stage 410). If the pre-correction string is available, count the number of differences between the constructed logical string and the pre-correction string (stage 412). The system counts the number of control characters, hard breaks, soft breaks, and/or unbalanced control characters (stage 414). If the stroke ordering is available, the number of differences between the order of constructed logical string and the order of the strokes is counted (stage 416). The system plugs in the results of each of these calculations into a cost function formula that generates the "current cost" (for this iteration) (stage 418). The process ends at end point 420.

FIG. 10 is a diagram for one implementation of the system of FIG. 1 that illustrates some exemplary analysis results produced at some selected iterations of the exemplary cost function of FIG. 9 called iteratively during the bi-directional process. The example shown is using Unicode bidi standard of lowercase for left-to-write words and uppercase for right-to-left words. Here is a legend that will assist in better understanding the output:

ov=original visual
cv=constructed visual
ol=original logical
cl=constructed logical When the cost function starts, the current cost is shown 452 (with a starting value of 253), along with various other values, such as the original visual string 454. In this example, the original logical string prior to the correction 456 is also available, but is optional. The constructed visual 458 and the constructed logical 460 as they stand at the current moment are also shown, which are still incorrect because the bi-directional process has just begun. Each time the cost function is called, the current cost is tracked, and the revisions to the constructed visual and constructed logical values are determined based on the best possible result of the ones considered. In the example shown in FIG. 10, this is showing portions of the best outcome at each iteration that is taking each character in the original visual one character at a time. In other implementations, more than one character at a time could be considered.

At some point during the iterations, control characters may be inserted that indicate how the logical string should be displayed. At the point the current cost is 151.1 at point 462 on the diagram, control characters 463 are inserted to indicate that the constructed logical string 470 should have an RLE encoding at the $8^{th}$ position. Question marks are used in this example to show the formatting characters inserted into the strings, since certain encodings cannot otherwise be displayed in a string. The original visual 464 and the constructed visual 468 have become identical at this point in the calculation. During the last iteration of this example when the current cost is 7 at point 472, there are multiple control characters (473 and 474). These control characters indicate that the RLE encoding should be inserted into the $9^{th}$ position of the constructed logical strings 480, and that a PDF encoding should be inserted into the $22^{nd}$ position. This is again shown by the question marks inserted in the string, since these characters cannot easily be displayed.

Note at this last iteration 472, the original visual 475 and the constructed visual 478 are identical, which is a good indication. Furthermore, the original logical string 476 is similar to the constructed logical 480, although they are not identical, because of corrections the user has made. The constructed logical string 480 with the encodings 473 are then converted as appropriate and passed to the other application, such as a word processor or spreadsheet, to allow the user to further work with the data.

Figure 11:
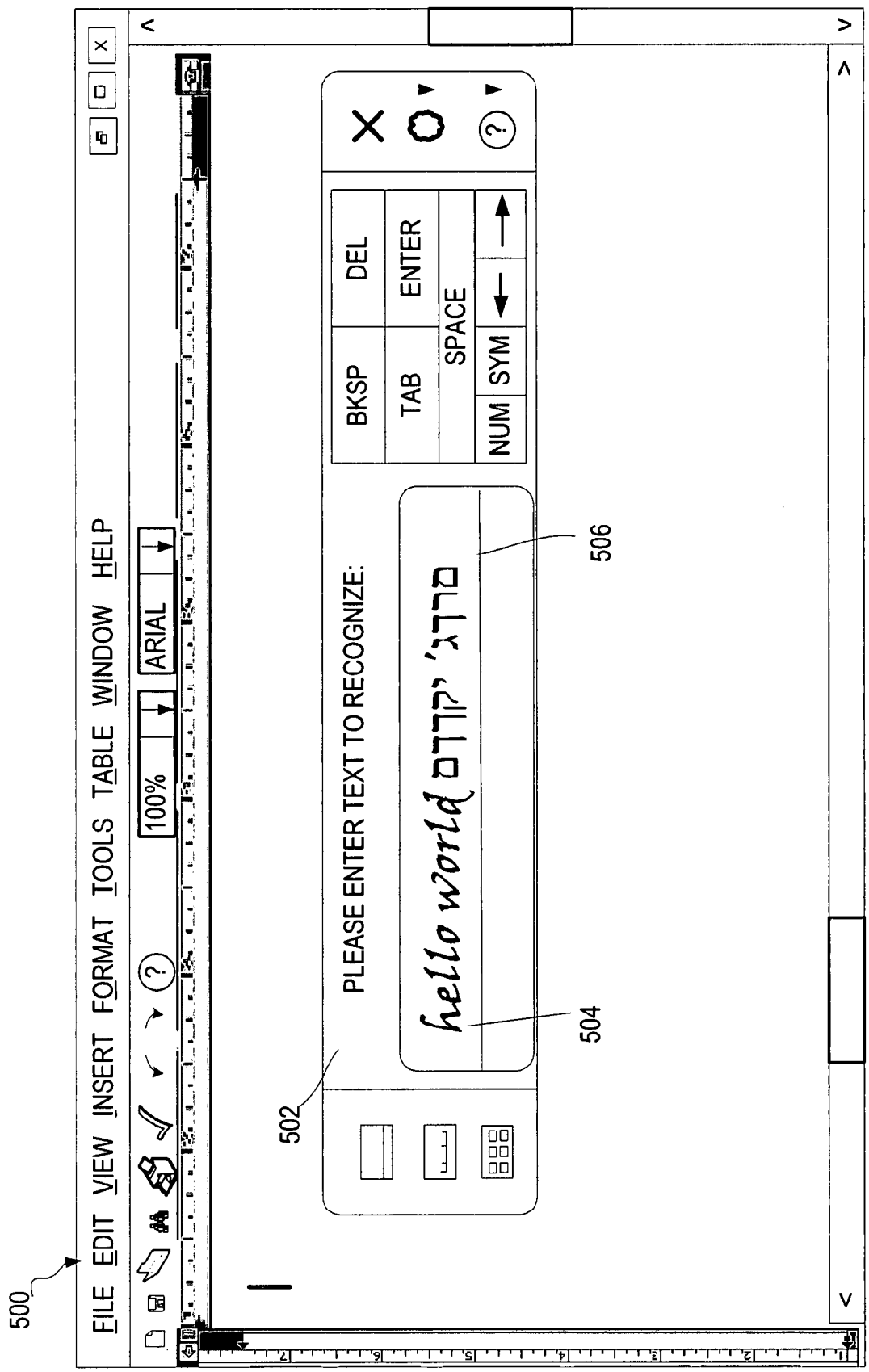
FIG. 11 is a simulated screen for one implementation of the system of FIG. 1 that illustrates inputting characters in a mixed language format from left-to-right and right-to-left.
Figure 12:
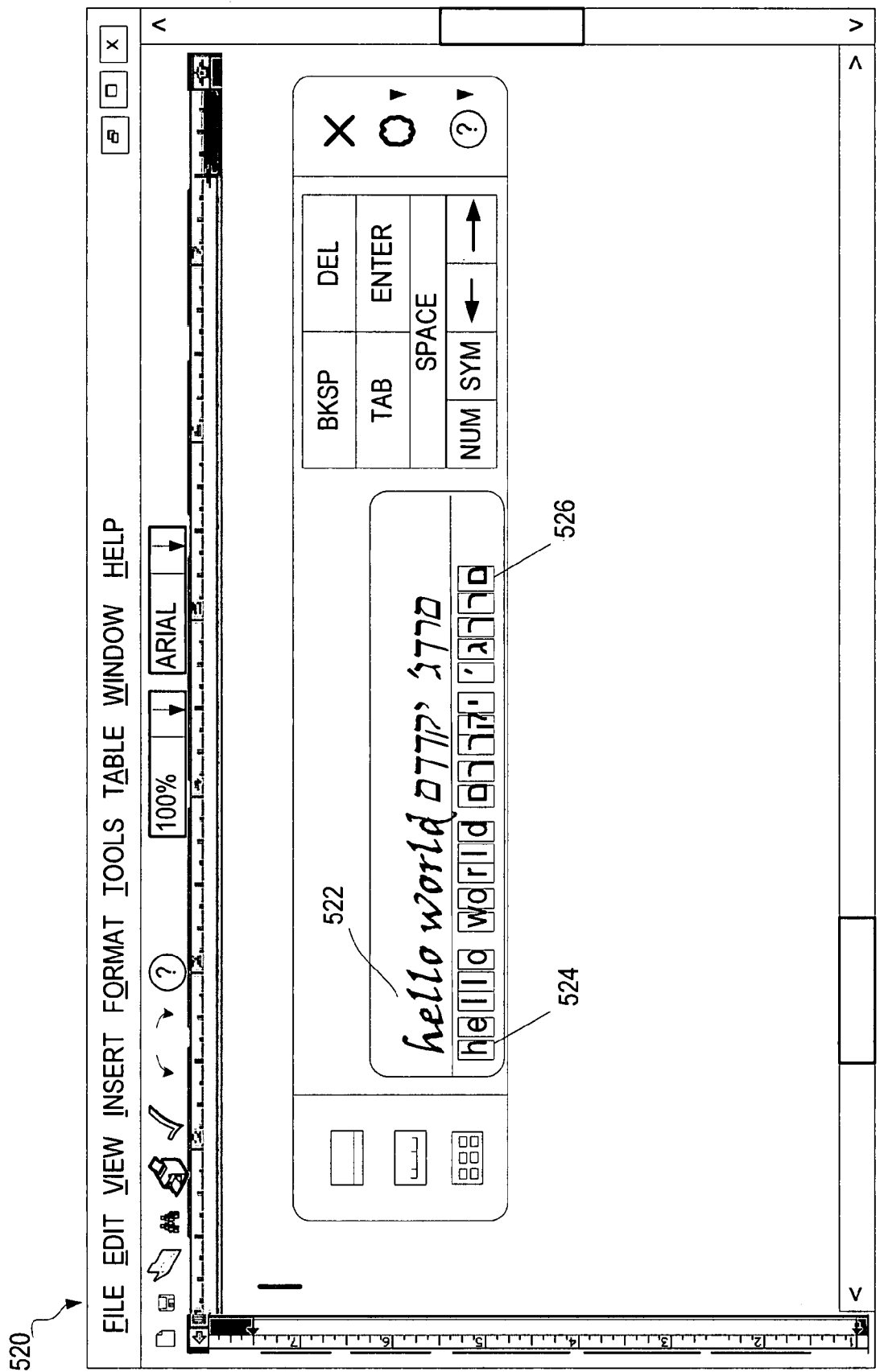
FIG. 12 is a simulated screen for one implementation of the system of FIG. 1 that illustrates character by character correction of mixed left-to-right and right-to-left characters in a boxed mode.
Figure 13:
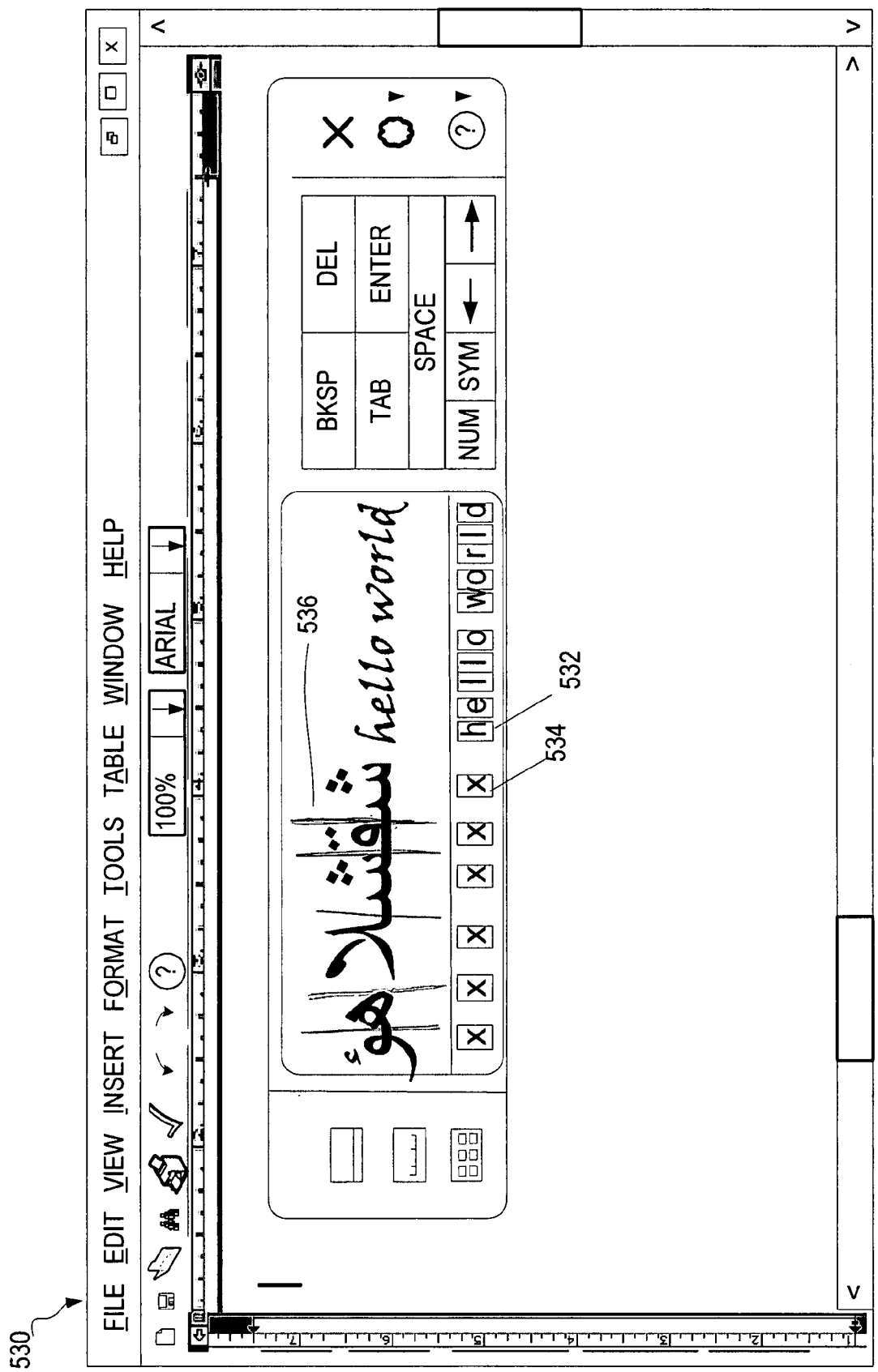
FIG. 13 is a simulated screen for one implementation of the system of FIG. 1 that illustrates character by character correction of mixed left-to-right and right-to-left characters with an irregular grid indicating where the character breaks are estimated to be for at least some of the cursively connected scripts.

Turning now to FIGS. 11-13, simulated screens are shown to illustrate a user interface for bi-directional handwriting recognition application 200. These screens can be displayed to users on output device(s) 552 (of FIG. 14). Furthermore, these screens can receive input from users from input device(s) 554 (of FIG. 14).

FIG. 11 is a simulated screen 500 for one implementation that illustrates inputting characters in a mixed language format from left-to-right and right-to-left. A handwriting input area 502 is shown with handwritten text that has been entered by a user. The user has entered some text 504 in a left-to-right language (English in this example), and has also entered some text 506 in a right-to-left language (Hebrew in this example). As the characters are recognized by the combined recognizer, a simulated screen 520 similar to FIG. 12 can be shown that allows the user to perform character by character recognition. Simulated screen 520 illustrates character by character correction of mixed left-to-right and right-to-left characters in a boxed mode. Similarly, the simulated screen 530 of FIG. 13 illustrates character by character correction of mixed left-to-right 532 and right-to-left characters 534 with an irregular grid indicating 536 where the character breaks are estimated to be for at characters that are normally displayed connected. The irregular grid can be used for languages where a break between characters is not whitespace, so the system must estimate where the break occurs. Examples of such languages can include Arabic and Hindi. Note that the x values shown in the right-to-left character area 534 are meant to represent to the corresponding character that was recognized by the recognizer in the particular language. For the sake of simplicity in the diagram, the x's are used.

As shown in FIG. 14, an exemplary computer system to use for implementing one or more parts of the system includes a computing device, such as computing device 540. In its most basic configuration, computing device 540 typically includes at least one processing unit 542 and memory 544. Depending on the exact configuration and type of computing device, memory 544 may be volatile (such as RAM), non-volatile (such as ROM, flash memory, etc.) or some combination of the two. This most basic configuration is illustrated in FIG. 14 by dashed line 546.

Additionally, device 540 may also have additional features/functionality. For example, device 540 may also include additional storage (removable and/or non-removable) including, but not limited to, magnetic or optical disks or tape. Such additional storage is illustrated in FIG. 14 by removable storage 548 and non-removable storage 550. Computer storage media includes volatile and nonvolatile, removable and non-removable media implemented in any method or technology for storage of information such as computer readable instructions, data structures, program modules or other data. Memory 544, removable storage 548 and non-removable storage 550 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 540. Any such computer storage media may be part of device 540.

Computing device 540 includes one or more communication connections 556 that allow computing device 540 to communicate with other computers/applications 558. Device 540 may also have input device(s) 554 such as keyboard, mouse, pen, voice input device, touch input device, etc. Output device(s) 552 such as a display, speakers, printer, etc. may also be included. These devices are well known in the art and need not be discussed at length here. In one implementation, computing device 540 includes bi-directional handwriting recognition application 200, as described in the earlier figures.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A tangible computer-readable storage medium comprising computer-executable instructions that when executed via a microprocessor perform a method, comprising:
   providing a combined handwriting recognizer that supports both left-to-right and right-to-left language recognition and is configured to make an identification of text received by the combined handwriting recognizer using a combined dictionary, with the combined dictionary comprising a first dictionary from a language written in a left-to-right direction and a second dictionary from a language written in a right-to-left direction, the direction of entries in at least one of the first dictionary and the second dictionary reversed such that terms appear backwards.

2. The tangible computer-readable storage medium of claim 1, comprising:
   providing a correction feature that supports character by character correction of at least one of left-to-right and right-to-left text in a visual order.

3. The tangible computer-readable storage medium of claim 2, comprising:
   performing the character by character correction in a handwriting input area.

4. The tangible computer-readable storage medium of claim 1, comprising:
   converting mixed left-to-right and right-to-left text in a visual order to a logical order using an inverse bi-directional process; and
   sending the mixed text from a handwriting input area to another application in the logical order.

5. The tangible computer-readable storage medium of claim 4, comprising:
   including in the mixed text sent from the handwriting input area some text that was corrected by a user.

6. The tangible computer-readable storage medium of claim 4, comprising:
   using a beam search as part of the inverse bi-directional process to produce the logical order.

7. The tangible computer-readable storage medium of claim 6, comprising:
   using, as part of the beam search, a cost function that determines how well a plurality of desired goals are achieved for a given state.

8. A method, comprising:
   estimating respective character breaks for mixed handwritten text received from a user if breaks between respective characters of the mixed handwritten text do not comprise whitespace;
   using a combined recognizer with a combined dictionary to generate recognition result for the mixed handwritten text, the mixed handwritten text comprising handwritten left-to-right text from a first language and handwritten right-to-left text from a second language; and
   displaying the recognition result in a visual order.

9. The method of claim 8, comprising:
   receiving input from the user to correct a first character in the recognition result; and
   displaying the corrected character and a remaining set of uncorrected characters in the recognition result as a second recognition result.

10. The method of claim 8, comprising:
   receiving a selection to send the second recognition result to a separate application.

11. The method of claim 10, comprising:
   converting the second recognition result from a visual order to a logical order using an inverse bi-directional process based upon the received selection.

12. The method of claim 11, comprising:
   sending the second recognition result in the logical order to the separate application.

13. The method of claim 11, comprising:
   performing a beam search as part of the inverse bi-directional process.

14. A tangible computer-readable storage medium having computer-executable instructions for causing a computer to perform the method of claim 8.

15. A method for performing an inverse bi-directional process for handwriting recognition, comprising:
   receiving an original visual string for handwriting that has been recognized by a combined recognizer;
   performing a beam search that uses a heuristic cost function to estimate a promise of respective nodes being examined; and
   determining a logical order of the visual string based upon results of the beam search.

16. The method of claim 15, comprising:
   sending the determined logical order of the visual string to a separate application configured to receive the logical order for further manipulation by a user.

17. A tangible computer-readable storage medium having computer-executable instructions for causing a computer to perform the method of claim 15.

18. The method of claim 8, comprising:
   generating the recognition result based upon the estimated character breaks.

19. The method of claim 8, comprising:
   displaying the estimated character breaks in an irregular grid.

* * * * *

UNITED STATES PATENT AND TRADEMARK OFFICE
CERTIFICATE OF CORRECTION

PATENT NO. : 8,111,922 B2  
APPLICATION NO. : 11/811367  
DATED : February 7, 2012  
INVENTOR(S) : David V. Winkler It is certified that error appears in the above-identified patent and that said Letters Patent is hereby corrected as shown below:

ON THE TITLE PAGE  
Item (57), under "Abstract" column 2, line 2, delete "bi-handwriting directional" and insert -- bi-directional --, therefor.

IN THE CLAIMS:  
In column 9, line 16, in Claim 8, after "generate" insert -- a --.

In column 9, line 27, in Claim 10, delete "8," and insert -- 9, --, therefor.

Signed and Sealed this  
Twenty-seventh Day of March, 2012

David J. Kappos  
*Director of the United States Patent and Trademark Office*